United States Patent [19]

Ryan

[11] 4,241,615

[45] Dec. 30, 1980

[54] VIBRATING DEVICE

[75] Inventor: John W. Ryan, Yowie Bay, Australia

[73] Assignee: Agrow Plow Pty. Limited, Sydney, Australia

[21] Appl. No.: 932,021

[22] Filed: Aug. 8, 1978

[30] Foreign Application Priority Data

Aug. 19, 1977 [AU] Australia ............................ PD1307

[51] Int. Cl.[2] ............................................ F16H 33/00

[52] U.S. Cl. ......................................... 74/61; 74/87; 172/40; 366/128

[58] Field of Search ................... 74/61, 87; 209/366.5, 209/367; 366/128; 172/40

[56] References Cited

U.S. PATENT DOCUMENTS

| | | | |
|---|---|---|---|
| 1,668,984 | 5/1928 | Simpson | 74/61 |
| 3,396,804 | 8/1968 | Rogers | 172/40 |
| 3,913,409 | 10/1975 | Opderbeck | 74/61 |

FOREIGN PATENT DOCUMENTS

| | | | |
|---|---|---|---|
| 2656347 | 6/1978 | Fed. Rep. of Germany | 74/87 |
| 984492 | 2/1951 | France | 74/61 |
| 554009 | 4/1977 | U.S.S.R. | 366/128 |

*Primary Examiner*—James Kee Chi

*Attorney, Agent, or Firm*—Haseltine, Lake & Waters

[57] ABSTRACT

A vibrating device having a mass rotated about a first shaft while the first shaft is rotated about a second shaft.

7 Claims, 4 Drawing Figures

FIG. 4
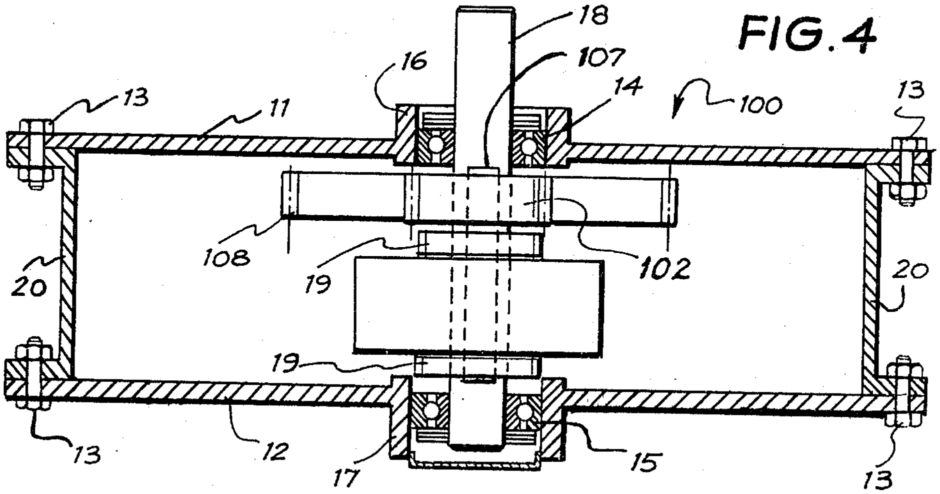
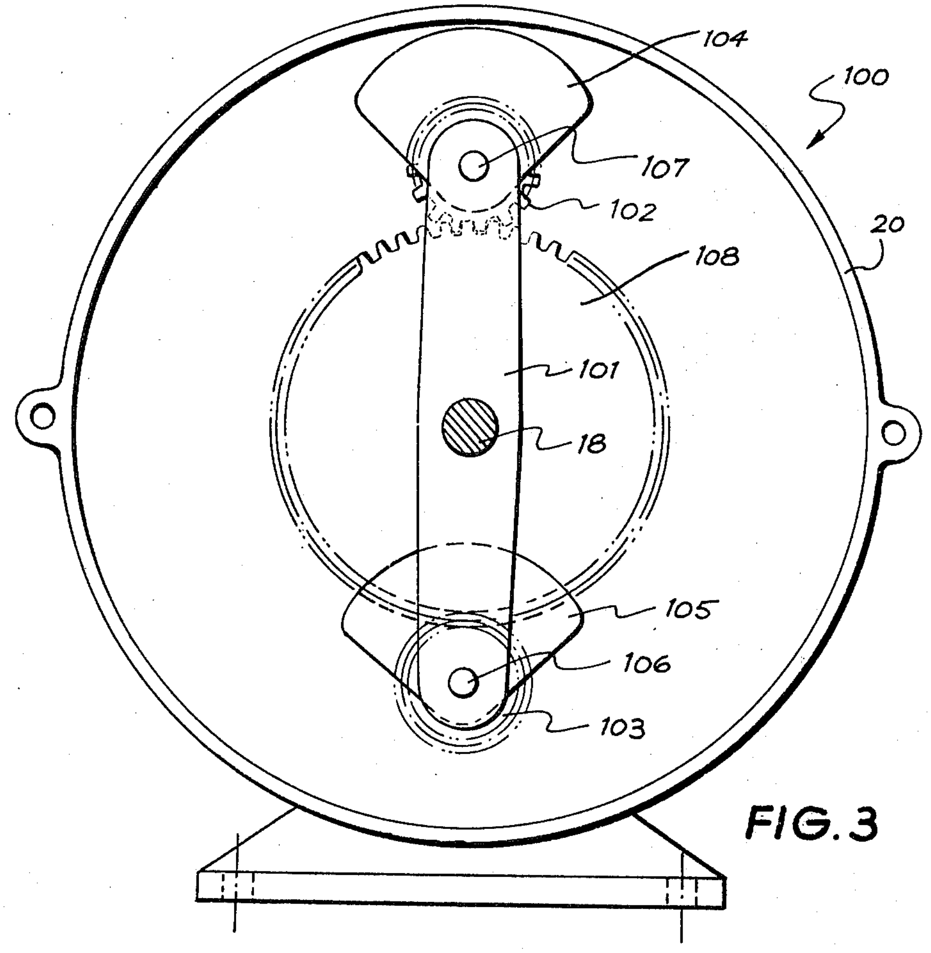
FIG. 3

VIBRATING DEVICE

The present invention relates to vibrating devices and more particularly but not exclusively vibrating devices for ploughs.

It is desirable when applying a vibrating force to the frame of a plough, as well as other pieces of equipment, that a component of the vibration force be aligned in a particular direction, or number of directions. It is also desirable for the device to be compact and provide a large vibration force for its size and weight.

In devices which employ centripetal forces to supply a vibration it can be seen that since the centripetal force$=mrw^2$; where m is the mass of the object being rotated, r is the radius of rotation and w is the angular velocity of the object; the method of increasing the vibration force without increasing the size and weight of the device is to increase the angular velocity.

Keeping the above in mind the present invention provides a vibrating device comprising a housing, a rotatable first shaft supported by and located in said housing, a mass to be rotated within said housing to vibrate the device, first means mounting said mass on said first shaft at a position spaced from the axis of said first shaft, said first means including an arm attached to and extending radially outwardly from said first shaft, a second shaft rotatably attaching said mass to a radially outer portion of said arm so that the centre of gravity of said mass is radially spaced from the axis of said second shaft, and second means to rotate said mass about the axis of said second shaft when said arm is rotated relative to said housing.

Preferred forms of the present invention will now be described by way of example with reference to the accompanying drawings wherein:

FIG. 3 is a part front elevation of a further embodiment of the present invention and FIG. 4 is a sectioned plan view of the device of FIG. 3.

Figure 1:
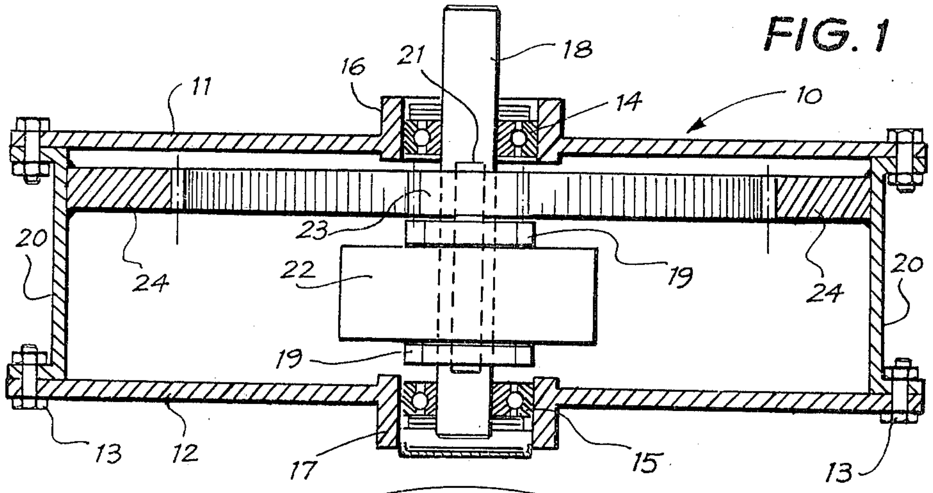
FIG. 1 is a sectioned plan view of a vibrating device embodying the present invention.
Figure 2:
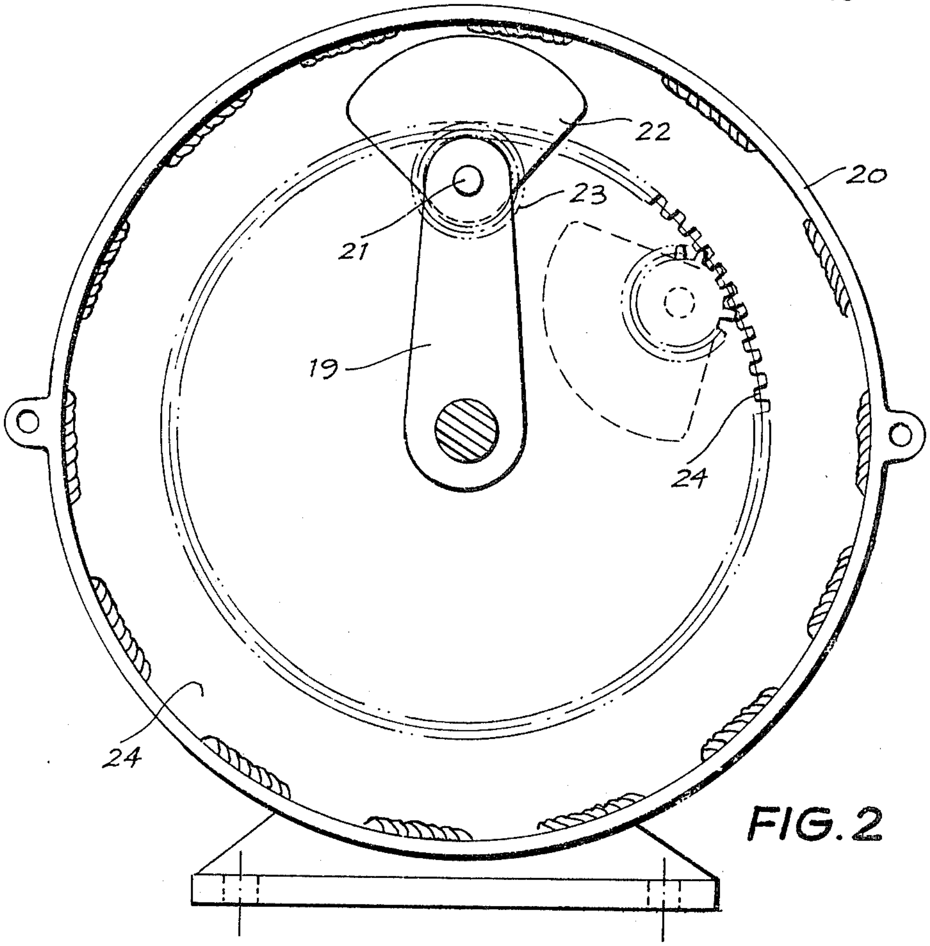
FIG. 2 is a part front elevation of the device of FIG. 1.

The embodiment of FIGS. 1 and 2 develops a vibration force by rotating the mass 22 about the longitudinal axis of shaft 21 as well as about the longitudinal axis of shaft 18. Additionally, a centripetal force also results from the rotation of arms 19 about the longitudinal axis of shaft 18, but this centripetal force is small compared with the two centripetal forces supplied by the rotation of mass 22.

The vibrating device 10 depicted has a split housing of three parts 11, 12 and 20 secured together by bolts 13, of which not all are illustrated. Supported by bearings 14 and 15, located in bearing supports 16 and 17, is the drive shaft 18 to which is fixed radially extending arms 19. Extending between the arms 19 is the shaft 21 which rotatably supports the gear 23 and mass 22 fixed thereto. The gear 23 is in meshing engagement with the internal gear 24 which is fixed relative to the housing 20, consequently by rotating the arms 19 the gear 23 and mass 22 revolve about the shaft 18 in a planetary motion. It should be noted that with the present arrangement the ratio of the diameters of gears 23 and 24 is approximately 1 to 3, thus the angular velocity of gear 23 about its longitudinal axis is three times the angular velocity of the arms 19 (and shaft 18). Thus the centripetal force created by rotating mass 22 about the shaft 21 is the largest of the three forces.

By altering the ratio of the two gears 23 and 24 as well as the starting positions of the various rotating parts, the direction of maximum force is determined as well as its magnitude, given a predetermined angular velocity for shaft 18. A position of maximum force is illustrated in FIG. 2 while a position of minimum force is illustrated by the dashed lines.

The above described embodiment has several drawbacks in that the full capacity of the device is not utilised, while probably the most prominent drawback is that an oscillating torque is applied to the drive shaft 18. The oscillating torque is the result of the mass 22 moving toward and away from shaft 18 and the fact that its angular momentum will remain constant if not acted upon by an outside force. As the mass 22 moves toward the shaft 18 it will try to accelerate the shaft 18 in an attempt to increase its angular velocity in an attempt to maintain its angular momentum. Additionally the mass 22 will apply an alternating positive and negative torque to the shaft 18 due to the centripetal force, created by its rotation about shaft 21, acting at a radius from the shaft 18.

To avoid an oscillating torque being applied to shaft 18 and thus substantially isolate the drive from any illeffects thereof, the above embodiment has been modified to provide the embodiment of FIG. 3.

Referring now to FIGS. 3 and 4 wherein the elements of the vibrating device 100 which are the same as the elements of the device 10 of FIGS. 1 and 2 have been given the same reference numbers, it can be seen that the arms 101 are provided at its extremities with two gears 102 and 103 and two masses 104 and 105 attached respectively to the two gears 102 and 103. The gears 102 and 103 are in meshing engagement with the gear 108 and are rotatably supported by shafts 106 and 107.

With this arrangement clockwise rotation of arms 101 at a constant angular velocity causes clockwise rotation of both masses 104 and 105 via gears 102 and 103, and since the masses 104 and 105 are in phase the total angular momentum of the moving assembly consisting of the arms 101, gears 102 and 103, and masses 104 and 105 remains substantially constant. Additionally, the centripetal forces created by the masses 104 and 105 rotating about shafts 106 and 107 apply torques to shaft 18 in opposite directions, thus cancelling out. However, it should be appreciated that the arms 101 are subjected to a bending moment about the longitudinal axis of shaft 18 as a result of the individual changes in angular momentum of the masses 104 and 105. The gear ratio is approximately 1 to 3.

Thus the embodiment of FIG. 3 provides a vibrating device which is smoother in operation than the embodiment of FIGS. 1 and 2 provided that the masses 104 and 105 are equal.

The embodiments of FIGS. 1 to 4 are only two examples of devices which incorporate the present invention, accordingly it should be appreciated that the invention is not limited to any particular gear ratio, or number of masses or gears, phase relationship of the masses, and further that the location of the gears is not restricted to the particular embodiments since the gear 108 could just as easily be rotated in addition to, or instead of, shaft 18.

I claim:

1. A vibrating apparatus comprising: a housing; a rotatable first shaft supported by and located in said housing; a first and a second mass, said respective masses being rotatable in phase within said housing to cause said device to vibrate, first means mounting each of the masses on said first shaft and being disposed radially from the axis of said first shaft, said first means being defined by an arm fixed to said first shaft, said arm having radially opposite first and second sections, said sections extending radially from said first shaft in opposite directions; a second shaft, said second shaft rotatably attached to said first mass and to a radially outer portion of said second section, whereby, the center of gravity of said first mass is radially spaced from the axis of said second shaft; a third shaft, said third shaft being adapted to rotatably attach said second mass to a radially outer portion of the first section to said second section for permitting the center of gravity of said second mass to be radially spaced from the axis of said third shaft; and second means to rotate said second mass about the axis of said third shaft in phase with said first mass, when said arm is rotated relative to said housing.

2. The device of claim 1 wherein the first, second and third shafts are substantially parallel.

3. The device of claim 1 or 2 wherein said second means comprises a first gear fixed relative to said housing, a second gear fixed to said first mass and meshingly engaging said first gear so that rotation of said arm causes rotation of said first mass about the axis of said second shaft by the engagement of said first gear with said second gear, and a third gear fixed to said second mass and meshingly engaging said first gear so that rotation of said arm causes rotation of said second mass about the axis of said third shaft by the engagement of said first gear with said third gear.

4. The device of claim 3 wherein said first gear is a gear having external teeth.

5. The device of claim 3 wherein said first gear is a ring gear having internal teeth.

6. The device of claim 3 wherein said arm comprises two parallel arm parts attached to said first shaft at longitudinally spaced positions; and said second and third shafts extend through both said arm parts and are rotatably supported thereby, said masses are located between said arm parts and are fixed to their respective second or third shaft, and said second and third gears are each attached to their respective second or third shaft at a position outside said arm parts.

7. An apparatus as claimed in claim 3, wherein: the ratio of said first gear to said second gear and said third gear is 3:1.

* * * * *